UNITED STATES PATENT OFFICE.

ALEXANDER W. WINTER, OF CHICAGO, ILLINOIS, ASSIGNOR TO JOSEPHINE AMANDA WINTER, WILLIAM H. LEE, AND FRED CHARLES LAIRD, OF SAME PLACE.

COMPOUND EDIBLE FAT.

SPECIFICATION forming part of Letters Patent No. 519,980, dated May 15, 1894.

Application filed February 13, 1894. Serial No. 500,048. (No specimens.)

*To all whom it may concern:*

Be it known that I, ALEXANDER W. WINTER, of Chicago, Illinois, have invented certain new and useful Improvements in Edible Compound Fats, of which the following is a specification.

The object of my invention is to provide an economical, useful and efficient compound designed for use in cooking or for similar purposes; and to that end it consists in combining with a base of mineral oil such fatty substances of either animal or vegetable fats in the proper proportions to make a stiff and useful compound.

In making my compound, I take a mineral oil, which has been preferably subjected to a refining process by distillation and pumping through animal charcoal, preferring to use the oil at a gravity 33° Baumé, though the gravity of the oil may be varied considerably from this and is dependent entirely upon the amount of refining that it has been subjected to. I place a quantity of this in any desired vessel. I then make a compound of the animal fats that I may desire to use, preferably oleo-stearine and tallow, of equal proportions. The vegetable fats I intend to use may be and are generally in a liquid state.

In mixing the elements together to form the compound, the animal fats are first reduced to a liquid state, and form substantially about thirty (30) per cent. of the compound. To this I add substantially sixty (60) per cent. of the refined mineral oil and substantially ten (10) per cent. of vegetable fats, preferably of the cotton seed, thoroughly commingling the same. I thoroughly refine the entire compound while it is still in its liquid form, as follows: The mixture is put into a tank or other suitable receptacle formed of either wood or iron, and is then melted or put in a condition whereby the different ingredients will mix thoroughly in their liquid state. After this the compound is agitated either by air or a mechanical agitator, and while this is going on the refining is carried out by adding fullers' earth or any of the other known refining agents. When the refining process is completed, the fullers' earth is eliminated by either allowing the mixture to settle or the mixture pumped out through a filter and keeping the mixture warm until the settling or filtering process is completed. After being refined, and filtered it is run over a cooling cylinder, agitated and drawn off into the various packages and allowed to solidify.

In describing the method of mixing my compound, I have only described one process, and it will be readily understood that various processes or methods may be used.

While I have described my compound as composed preferably of mineral oil, animal fats,—oleo-stearine and tallow—and vegetable fats,—preferably of the cotton seed, in certain proportions, I do not desire to be limited thereto unduly any more than is pointed out in the claims; on the contrary, I contemplate variations in the proportions of the elements forming the compound, the omission of certain fats and the substitution of equivalents, as circumstances may suggest or necessity render expedient.

While I speak in the specification of my improved compound as a compound lard, I do not wish to be understood as meaning that it contains hogs' fat as one of its necessary ingredients, though lard in the sense of hogs' fat may form one of the elements in the compound if it be desired. My primary purpose in the use of the expression "compound lard" is to signify that my improved compound may be used for the same purposes as lards or other compounds composed of oils and fatty substances.

I am aware that mineral oil and fatty substances have heretofore been mixed together to form lubricating and burning compounds, but my invention differs from these in that the ingredients are of such proportions and are mixed together in such a manner as to make a stiff and edible compound fat adapted to be used in the place of lard, butter or other food articles, and in that only deodorized or neutralized mineral oil is used in its manufacture.

I claim—

1. An edible compound fat, composed of refined mineral oil, and fatty substance in the proportions to form a stiff compound, substantially as described.

2. An edible compound fat, composed of refined mineral oil, animal fat, and vegetable fat, in the proportions to form a stiff compound, substantially as described.

3. An edible compound fat, composed of refined mineral oil, oleo-stearine, tallow, and vegetable fat of the cotton seed, substantially as described.

4. An edible compound fat composed of substantially, sixty (60) per cent. of refined mineral oil, and forty (40) per cent. fatty substance, substantially as described.

5. An edible compound fat composed of substantially, sixty (60) per cent. of refined mineral oil, thirty (30) per cent. animal fat, and ten (10) per cent. vegetable fat, substantially as described.

6. An edible compound fat composed of substantially, sixty (60) per cent. refined mineral oil, fifteen (15) per cent. oleo-stearine, fifteen (15) per cent. tallow, and ten (10) per cent. of cotton seed oil, substantially as described.

ALEXANDER W. WINTER.

Witnesses:
THOMAS T. SHERIDAN,
ANNIE C. COURTENAY.